(12) United States Patent
Golovchinsky et al.

(10) Patent No.: US 7,904,545 B2
(45) Date of Patent: Mar. 8, 2011

(54) SYSTEM AND METHOD FOR COLLABORATIVE ANALYSIS OF DATA STREAMS

(75) Inventors: Gene Golovchinsky, Menlo Park, CA (US); Cheng-Jia Lai, Mountain View, CA (US); Laurent Denoue, Palo Alto, CA (US); Jonathan Trevor, Santa Clara, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1137 days.

(21) Appl. No.: 11/264,217

(22) Filed: Nov. 1, 2005

(65) Prior Publication Data

US 2007/0100851 A1     May 3, 2007

(51) Int. Cl.
*G06F 15/16* (2006.01)
(52) U.S. Cl. .................................. 709/224; 707/705
(58) Field of Classification Search ............. 709/204, 709/200–202, 224; 705/1; 382/181; 707/705
See application file for complete search history.

(56) References Cited

U.S. PATENT DOCUMENTS

| | | | |
|---|---|---|---|
| 6,816,834 | B2 | 11/2004 | Jaroker |
| 7,539,702 | B2 * | 5/2009 | Deshmukh et al. .............. 1/1 |
| 2003/0033606 | A1 * | 2/2003 | Puente et al. ............. 725/110 |
| 2004/0220926 | A1 * | 11/2004 | Lamkin et al. ................ 707/3 |
| 2006/0064716 | A1 * | 3/2006 | Sull et al. .................... 725/37 |
| 2007/0003141 | A1 * | 1/2007 | Rittscher et al. ........... 382/181 |
| 2007/0043608 | A1 * | 2/2007 | May et al. ..................... 705/10 |
| 2007/0064974 | A1 * | 3/2007 | Ayachitula et al. ......... 382/103 |
| 2007/0106419 | A1 * | 5/2007 | Rachamadugu ............ 700/188 |

OTHER PUBLICATIONS

F. Cupillard et al., "Video Understanding for Metro Surveillance", Mar. 2004, The IEEE International Conference on Networking, Sensing and Control 2004 in the special session on Intelligent Transportation Systems.*
Bargeron et al., "Annotations for streaming video on the Web: system design and usage studies", May 1999, Computer Networks, vol. 3, Issues 11-16, pp. 1139-1153.*
F. Brémond, N. Maillot, M. Thonnat, and T. Vu, "Ontologies for Video Events" INRIA Research Report RR-5189, pp. 1-19, May 2004.
F. Cupillard, F. Brémond and M. Thonnat, Behaviour Recognition for Individuals, Groups of People and Crowd, In IEEE Proc. of the IDSS Symposium—Intelligent Distributed Surveillance Systems, London, UK. 5 pgs, Feb. 26, 2003.

(Continued)

*Primary Examiner* — Moustafa M Meky
(74) *Attorney, Agent, or Firm* — Morgan, Lewis & Bockius LLP

(57) ABSTRACT

Embodiments of the present invention combine the flexibility of the computer in segmenting, indexing, and retrieving data with the strengths of people in analyzing scenes. They provide a mechanism that allows a group of analyzers at distributed locations to collaborate in generating pieces of semantic information of a data stream, integrates these pieces into a summary representation that can be used for subsequent computation, and allows related hypotheses and information requests to be presented back to the analyzers. This description is not intended to be a complete description of, or limit the scope of, the invention. Other features, aspects, and objects of the invention can be obtained from a review of the specification, the figures, and the claims.

27 Claims, 2 Drawing Sheets

OTHER PUBLICATIONS

F. Cupillard, A. Avanzi, F. Brémond and M. Thonnat, "Video Understanding for Metro Surveillance". The IEEE International Conference on Networking, Sensing and Control 2004 in the special session on Intelligent Transportation Systems, Taiwan, 6 pgs, Mar. 2004.

Ram Nevatia, Jerry Hobbs and Bob Bolles, "An Ontology for Video Event Representation", Conference on Computer Vision and Pattern Recognition Workshop (CVPRW'04) vol. 7, pp. 1-10, Jun. 2004.

Nagia Ghanem, Daniel DeMenthon, David Doermann and Larry Davis, "Representation and Recognition of Events in Surveillance Video Using Petri Nets." 2004 Conference on Computer Vision and Pattern Recognition Workshop (CVPRW'04) vol. 7, pp. 1-9, 2004.

Li Yu, Terrance E. Boult, "Understanding Images of Graphical User Interfaces: A New Approach to Activity Recognition for Visual Surveillance," Computer Vision and Pattern Recognition Workshop, vol. 7, No. 7, 5 pgs, 2004.

Bargeron, D., Gupta, A., Grudin, J. and Sanocki, E., "Annotations for Streaming Video on the Web: System Design and Usage Studies," Computer Networks (Netherlands), Elsevier Science, May 17, 1999, vol. 31, No. 11-16, pp. 1139-1153, (12 pgs).

Cadiz, JJ., Balachandran, A., Sanocki, E., Gupta, A., Grudin, J., and Jancke, G., "Distance Learning Through Distributed Collaborative Video Viewing," Proc. Computer Supported Cooperative Work 2000, 135-144, (12 pgs) May 10, 2000.

Luis von Ahn and Laura Dabbish., "Labeling Images with a Computer Game," 8 pgs, CHI 2004.

* cited by examiner

SYSTEM AND METHOD FOR COLLABORATIVE ANALYSIS OF DATA STREAMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to the field of data stream analysis.

2. Description of the Related Art

Computers are effective at capturing and processing structured information, whereas human beings are more effective at capturing the gist, or semantics in ways that are not presently (if ever) possible computationally. Yet human beings are not good at rote operations, and are not effective when forced to work long amounts of time.

Data analysis such as video analysis and categorization is an important problem in a variety of disciplines, including surveillance. Data streams such as video, audio, and sensor data streams often contain semantic information that can be useful in a variety of applications, including data mining, information retrieval and summarization. Such information is easy for human beings to detect, but hard to identify via computational methods. While it is possible to segment video streams to detect potential events against a static background, it is difficult to automate such detection activities, which can be, for a non-limiting example, identifying individuals in a crowd or to track them between different cameras with poor calibration. It is even more difficult to automate detections of social means and behaviors that have a fuzzy definition, such as "suspicious behavior" and "fighting." Human beings, on the other hand, can be quite good at picking out important invariants in what are (to computers) quite noisy signals, and have a common sense to recognize social means and behaviors.

SUMMARY OF THE INVENTION

Various embodiments of the present invention combine the flexibility of the computer in segmenting, indexing, and retrieving data with the strengths of human being in analyzing scenes. They provide a mechanism that allows a large group of people (analysts) at distributed locations to collaborate in generating pieces of semantic information (metadata) of a data stream, integrates these pieces into an index, a database instance or other suitable data structures that can be used for subsequent computation, and allows related hypotheses and information requests (e.g., questions) to be presented back to the analysts. Each analyst only receives and/or processes a small segment of the overall data stream, while each segment may be processed by several analysts. This invention is useful for creating high-quality semantic indexes of large data streams, such as multi-camera surveillance video, without forcing any individual to process extensive amounts of the data stream. It also allows non-skilled or low-skilled analysts to perform routine tasks, allowing experienced analysts to concentrate on more complex tasks.

BRIEF DESCRIPTION OF THE DRAWINGS

Certain embodiments of the present invention will be described in detail on the following figures, wherein.

DETAILED DESCRIPTION OF THE INVENTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Figure 1:
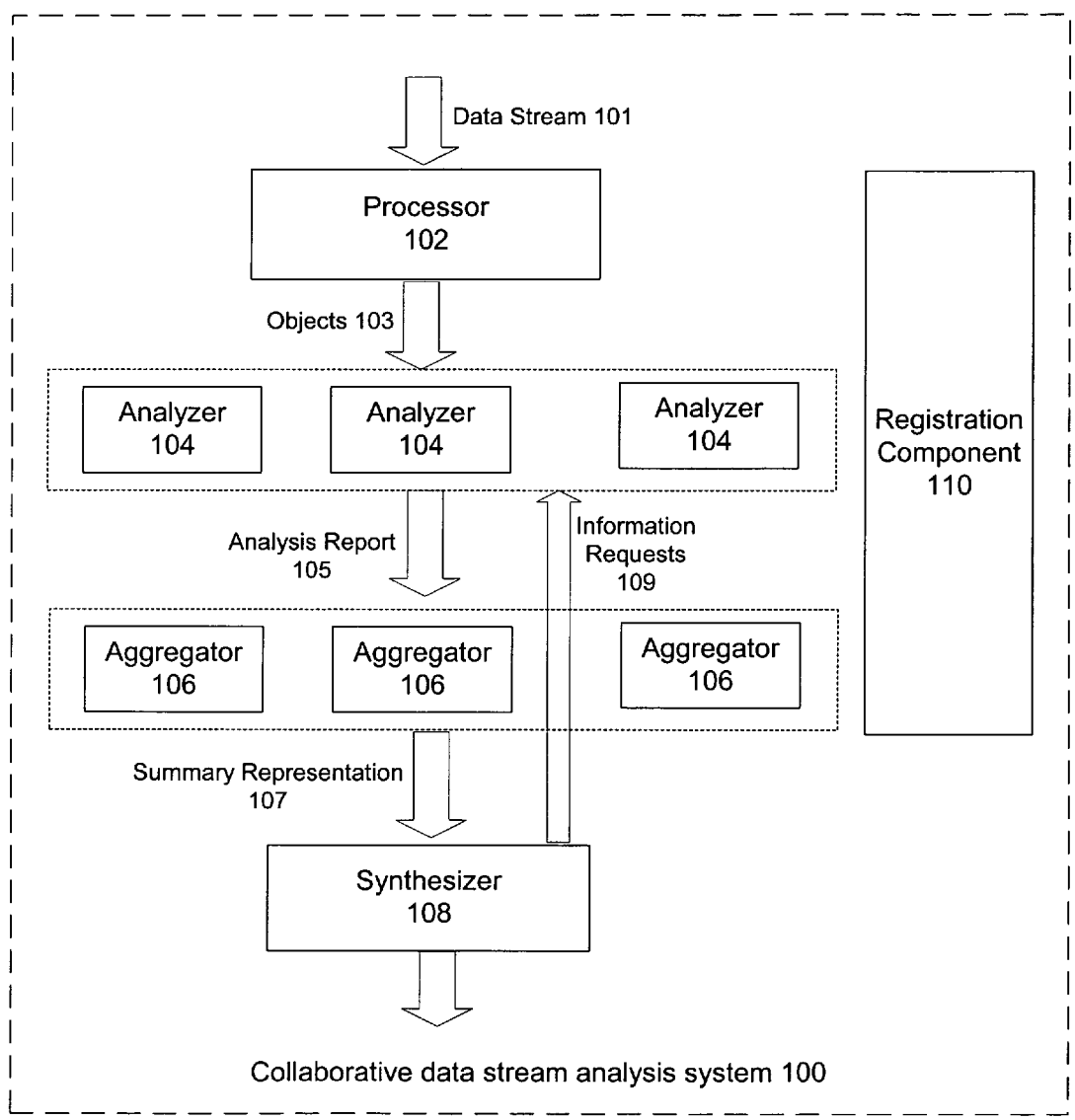
FIG. 1 an illustration of an exemplary system architecture for collaborative data stream analysis in one embodiment of the present invention.

FIG. 1 is an illustration of an exemplary system architecture 100 for collaborative data stream analysis in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, each of a plurality of processors 102 can accept a data stream 101 in the form of documents as its input, process the data stream, separate it into segments or objects 103 (referred to collectively as objects in the rest of this document) and distribute these objects to a plurality of analyzers 104 at the same or distributed physical locations. Each of the analyzers is operable to collect and analyze a subset of the objects distributed by the processors and generate an analysis report 105 containing metadata of these objects. Here, an analyzer is typically a person, but can also be an automatic agent (program) or a combination of the two. Each analyzer can be characterized by several properties: privileges (what they are allowed to do), capabilities (what they can do), expertise (what they are good at), performance, and history (what they have done before). One or more aggregators 106 are each operable to collect the analysis reports 105 of the objects from the distributed analyzers and create a summary representation 107, which can be one or more of: an index, a statistical aggregation, a textual summary, a database instance, and other derived representations. One or more synthesizers (controllers) 108 can then analyze the summary representation, formulate one or more hypotheses and pose one or more information requests 109 related to some object or a group of objects back to the analyzers. The system can also include an automated registration component 110 that allows a new component, which can be but is not limited to, a data source, a video segmentation algorithm, a full-text index, to be added into the system seamlessly and dynamically. The inherent value of this system lies in the ability to harness human beings' common sense in processing information. Thus analysts will not necessarily be required to have much training, although it is possible that some instructions on how to phrase descriptions would be useful.

The various components of the system described above can be computing devices, each of which can be but is not limited to, a laptop or desktop PC, a workstation, a Tablet PC, a Pocket PC, and a mainframe computer. These components can communicate with each other through well-established software interfaces that can be Application Programming Interfaces (APIs) and/or Web services.

Figure 2:
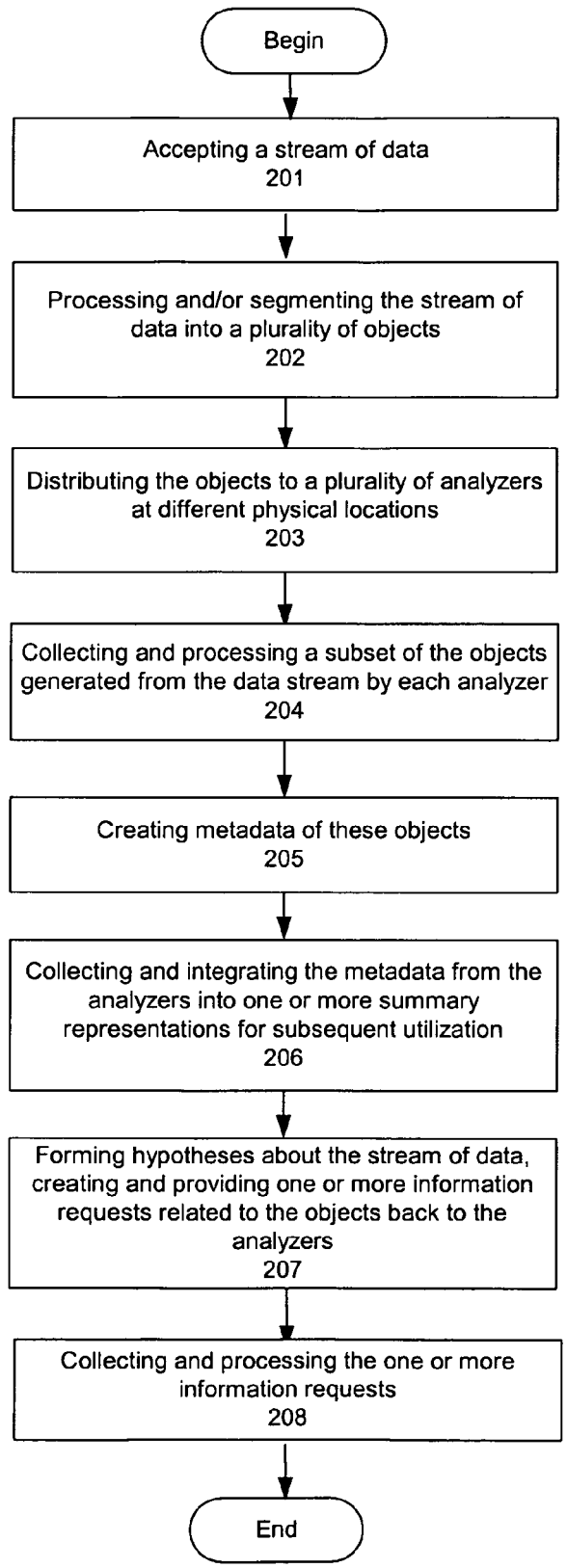
FIG. 2 is a flow chart illustrating an exemplary collaborative data stream analysis process in one embodiment of the present invention.

FIG. 2 is a flow chart illustrating an exemplary collaborative data stream analysis process in one embodiment of the present invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, a stream of data can be accepted at step 201 and processed and/or segmented into a plurality of discrete objects at step 202. At step 203, these objects can be distributed to a plurality of analyzers located at various physical locations. Each analyzer can then collect and process a subset of the objects generated from the data stream at step 204 and create metadata of these objects at step 205. The created metadata from the analyzers can then be collected and integrated into one or more summary representations at step 206 for subsequent utilization. Finally, hypotheses can be formed about the stream of data and one or more information requests related to some object or group of objects can be created and provided back to the analyzers at step 207 and the analyzers will collect and process the one or more information requests accordingly at step 208.

In some embodiments, the objects can be generated by the processors automatically from a continuous data stream such as a video and/or audio stream, based on one or more segmentation algorithms. Segmentation is not necessary for sources that are inherently discrete, such as photographs, chunks of text extracted from larger documents, or composites created manually by privileged users such as an administrator.

In some embodiments, each of the analyzers is operable to process the objects either manually or via software algorithms using one of pattern matching, data mining, and textual processing. More specifically, audio, video, and sensor data can be segmented manually or automatically into time intervals based on the amount of activity or through some other heuristic methods. It is also possible for an analyzer to use an algorithm that automatically skips or speeds up uninteresting objects (e.g. lack of activities in video) to avoid spending analysis efforts in vain. In addition, textural documents can be segmented into sections, paragraphs, or other units.

In some embodiments, it is also possible for the processors to synthesize new objects by recomposing existing ones e.g., an object consisting of automatically-identified images that reportedly contain red cars. Manual analysis of these composite objects will generate more useful or higher level semantic information for the overall data stream.

In some embodiments, the metadata can be in one or more of following forms: structured (semantic), semi-structured, freeform description and statistical. The information contained in the metadata can include at least one or more of the following: a categorization, a freeform description of a portion of the stream of data, and a set of keywords.

In some embodiments, social aspects of this present invention may relate to the degree of trust in the analyzers and to the sensitivity of the data being analyzed. If the data is particularly sensitive, analyzers will need to be vetted and access controls need to be applied to objects and to analyzers. This will allow the system to determine automatically who is allowed to see which objects. In addition, analysts' ability to make useful judgments about objects can be tested by randomly adding known objects and comparing the analysts' description to accepted descriptions of that object. This information can be used for training purposes or to detect malicious or random input.

In some embodiments, the system supports two basic modes of analyzing the objects from a data stream: descriptive and hypothesis-testing.

In the descriptive mode, an analyzer creates textual or structured descriptions of the objects, and an aggregator integrates these descriptions to index the content of the analyzed data stream.

In the hypothesis-testing mode, the synthesizers are responsible for formulating hypotheses about the data stream and using the system to test these hypotheses (while the analyzers are responsible for generating descriptions and categorizations of objects). Information requests generated by the synthesizers may also include references that can be, but are not limited to, images, sounds, video, sensor data, or other data that describe to the analyzers the subjects of interest. For a non-limiting example, a useful information request might include a picture of a person from some source with a prompt asking if this person is found in a given object. The synthesizer posing the request can specify the range of objects against which a request will be applied, and what domain expertise the analyst requires (if any) to answer it. These requests can be distributed to analyzers using the same method as in the descriptive mode. The answers to these information requests are collected, indexed, and routed to the synthesizer who is testing the hypothesis.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "interface" is used in the embodiments of the systems and methods described above, it will be evident that such concept can be interchangeably used with equivalent concepts such as, bean, class, method, type, component, object model, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to support collaborative data stream analysis, comprising:
   one or more processors each operable to:
      process a stream of data into a plurality of objects; and
      distribute respective subsets of the plurality of objects to a plurality of analyzers at a plurality of physical locations;
   said plurality of analyzers each operable to collect and process a subset of the plurality of objects from the one or more processors to generate metadata for the subset of the plurality of objects, to collect and process one or more information requests from one or more synthesizers, and to return to the synthesizers results of the information requests;
   one or more aggregators each operable to collect and integrate the metadata from the plurality of analyzers into one or more summary representations; and
   said one or more synthesizers each operable to:
      create one or more hypotheses for the data stream based on the one or more summary representations;
      create said one or more information requests to test the one or more hypotheses for the data stream; and
      provide the one or more information requests to the plurality of analyzers.

2. The system according to claim 1, further comprising at least one of:
   a registration component operable to register a new component into the system.

3. The system according to claim 1, wherein:
   the one or more processors, analyzers, aggregators, and synthesizers can communicate with each other via a plurality of software interfaces.

4. The system according to claim 3, wherein:
   each of the plurality of software interfaces can be a web service or an API.

5. The system according to claim 1, wherein:
   the stream of data can include at least one of: a video stream, an audio stream, a sensor data stream, and a textual document.

6. The system according to claim 1, wherein the one or more processors are operable to test a respective analyzer by:
   distributing known objects to the respective analyzer; and
   comparing the metadata for the known objects to accepted metadata for the known objects.

7. The system according to claim 1, wherein:
   at least a subset of the operations performed by each of the plurality of analyzers is performed by a person, an automatic agent, or a combination of the two.

8. The system according to claim 1, wherein:
   each of the plurality of analyzers can be characterized by privileges, capabilities, expertise, performance, and history.

9. The system according to claim 1, wherein:
   the metadata can be in one or more forms of: structured, semi-structured, freeform description, and statistical.

10. The system according to claim 9, wherein:
    the metadata can include one or more of: a categorization, a freeform description of a portion of the stream of data, and a set of keywords.

11. The system according to claim 1, wherein:
    each of the one or more summary representations can be one or more of: an index, a statistical aggregation, a textual summary, and a database instance.

12. The system according to claim 1, wherein:
    each of the one or more processors is further operable to recompose existing objects in the subset of the plurality of objects into one or more new objects.

13. The system according to claim 1, wherein:
    each of the plurality of analyzers is operable to generate the metadata either manually or via a software algorithm via at least one of: pattern matching, data mining, and textual processing.

14. The system of claim 1, wherein at least a subset of the operations performed by each of the plurality of analyzers is performed by a person.

15. The system of claim 1, wherein the one or more information requests include references that describe to the plurality of analyzers subjects of interests, and wherein a respective reference is selected from the group consisting of an image, a sound, a video, and sensor data.

16. A method to support collaborative data stream analysis, comprising:
    processing a stream of data into a plurality of objects;
    distributing respective subsets of the plurality of objects to a plurality of analyzers distributed at a plurality of physical locations;
    collecting and processing a subset of the plurality of objects to generate metadata for the subset of the plurality of objects and to collect and process one or more information requests via the plurality of analyzers;
    collecting and integrating the metadata from the plurality of analyzers into one or more summary representations;
    creating one or more hypotheses for the data stream based on the one or more summary representations;
    creating the one or more information requests to test the one or more hypotheses for the data stream;
    providing the one or more information requests to the plurality of analyzers; and
    receiving results of the one or more information requests from the plurality of analyzers.

17. The method according to claim 16, further comprising:
    generating the metadata either manually or via a software algorithm using at least one of: pattern matching, data mining, and textual processing.

18. The method according to claim 16, further comprising:
    recomposing existing objects in a subset of the plurality of objects into one or more new objects.

19. The method of claim 16, wherein at least a subset of the operations performed by each of the plurality of analyzers is performed by a person.

20. The method of claim 16, wherein the one or more information requests include references that describe to the plurality of analyzers subjects of interests, and wherein a respective reference is selected from the group consisting of an image, a sound, a video, and sensor data.

21. The method of claim 16, further comprising testing a respective analyzer by:
- distributing known objects to the respective analyzers; and
- comparing the metadata for the known objects to accepted metadata for the known objects.

22. A non-transitory machine readable medium having instructions stored thereon that when executed cause a system to:
- process a stream of data into a plurality of objects;
- distribute respective subsets of the plurality of objects to a plurality of analyzers distributed at a plurality of physical locations;
- collect and process a subset of the plurality of objects to generate metadata for the subset of the plurality of objects and to collect and process one or more information requests via the plurality of analyzers;
- collect and integrate the metadata from the plurality of analyzers into one or more summary representations;
- create one or more hypotheses for the data stream based on the one or more summary representations;
- create the one or more information requests to test the one or more hypotheses for the data stream;
- provide the one or more information requests to the plurality of analyzers; and
- receive results of the one or more information requests from the plurality of analyzers.

23. The machine readable medium of claim 22, wherein the one or more information requests include references that describe to the plurality of analyzers subjects of interests, and wherein a respective reference is selected from the group consisting of an image, a sound, a video, and sensor data.

24. The machine readable medium of claim 22, further comprising instructions to test a respective analyzer by:
- distributing known objects to the respective analyzer; and
- comparing the metadata for the known objects to accepted metadata for the known objects.

25. A system to support collaborative data stream analysis, comprising:
- means for processing a stream of data into a plurality of objects;
- means for distributing respective subsets of the plurality of objects to a plurality of analyzers distributed at a plurality of physical locations;
- means for collecting and processing a subset of the plurality of objects to generate metadata for the subset of the plurality of objects and to collect and process one or more information requests via the plurality of analyzers;
- means for collecting and integrating the metadata from the plurality of analyzers into one or more summary representations;
- means for creating one or more hypotheses for the data stream based on the one or more summary representations;
- means for creating said one or more information requests to test the one or more hypotheses for the data stream;
- means for providing the one or more information requests to the plurality of analyzers; and
- means for receiving results of the one or more information requests from the plurality of analyzers.

26. The system of claim 25, wherein the one or more information requests include references that describe to the plurality of analyzers subjects of interests, and wherein a respective reference is selected from the group consisting of an image, a sound, a video, and sensor data.

27. The system of claim 25, further comprising means for testing a respective analyzer by:
- distributing known objects to the respective analyzer; and
- comparing the metadata for the known objects to accepted metadata for the known objects.

* * * * *